Feb. 21, 1967 J. E. YOUNG 3,305,737

PRESSURE TRANSDUCING KEY

Filed Dec. 26, 1963

2 Sheets-Sheet 1

INVENTOR.
JAMES E. YOUNG
BY Anthony D. Cennamo
Daniel Rubin
ATTORNEY

INVENTOR.
JAMES E. YOUNG

BY Anthony D. Cennamo
Daniel Rubin
ATTORNEY 3,305,737
Patented Feb. 21, 1967

3,305,737

PRESSURE TRANSDUCING KEY

James E. Young, Pittsford, N.Y., assignor to Xerox Corporation, Rochester, N.Y., a corporation of New York Filed Dec. 26, 1963, Ser. No. 333,516
6 Claims. (Cl. 307—88.5)

Figures 1, 2:
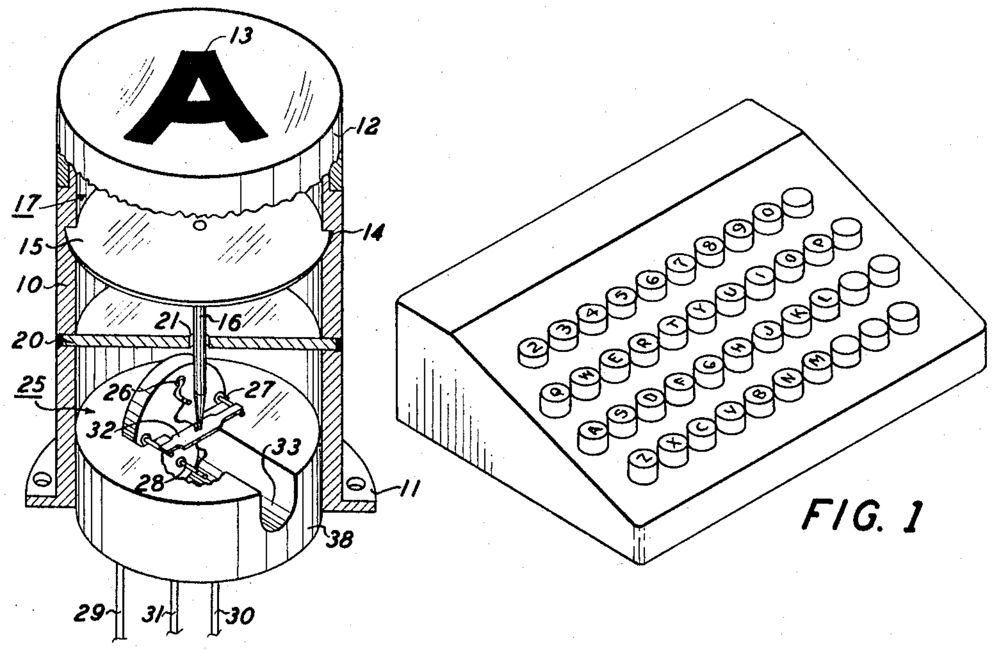

This invention relates to a novel article of manufacture comprising a pressure sensitive signal emitting key. More particularly, the invention relates to a novel form of signal amplifying device useful as a component of peripheral equipment to emit electrical data input signals to logic or actuation circuits as to a computer or the like.

With the advent of high speed computers and other mechanical and electronic devices which produce data at high rates of speed, there has arisen a concomitant need for high-speed data input devices thereto for otherwise speed limitations in the input mechanism may act to retard the operation of the entire machine.

One of the more common forms of input mechanisms comprises a manually operable console-type keyboard comprised of a plurality of individual keys each identified with differentiated and selective information. The keys are operable in typewriter fashion such that each key when actuated is intended to emit a particular electrical input signal representative of selective information. Currently, keys of the type employed utilize electro-mechanical transducers or linkages by which mechanical movement of the key in response to an operator's touch effects the signal input to the recipient equipment. Keys of this prior type have generally imposed certain limitations, and, as a result, handicapped the system of which they are a part. Particularly, the manual features and movement of the prior art individual keys have imposed a speed limitation on the operator. At the same time, mechanical failures of the linkages due to environmental factors or wear, radio frequency interference generated by the typewriter effecting receivers in the area, to name a few, have handicapped reliability and sensitivity of this system. Accordingly, there has been a long-felt need to overcome these prior difficulties by providing highly sensitive key members susceptible to greater speed of operation having greater reliability than heretofore as to be able to emit a signal more compatible with the requirements of the recipient equipment.

Now in accordance with the instant invention, there is provided a novel compact key member which may be utilized individually or adapted for assembly in a keyboard arrangement. The key is substantially motionless, as will be understood, having high pressure sensitivity in response to which there is emitted an amplified electrical data input signal to externally located utilization equipment.

It is therefore an object of the invention to provide a novel highly sensitive key member for emitting data input signals to data processing apparatus or the like.

It is a further object of the invention to provide a novel touch sensitive key member adapted for keyboard assembly for emitting selective data input signals to data processing apparatus.

Figure 4:
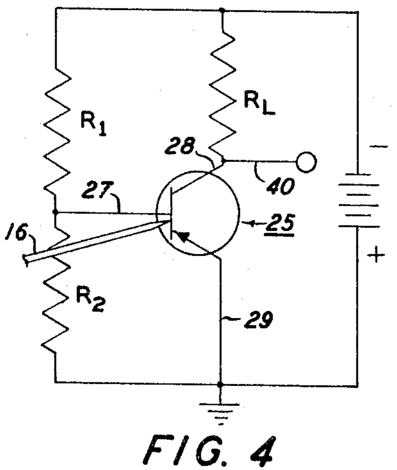
Figure 3:
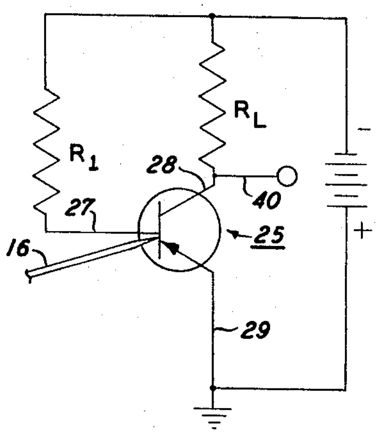
Figure 5:
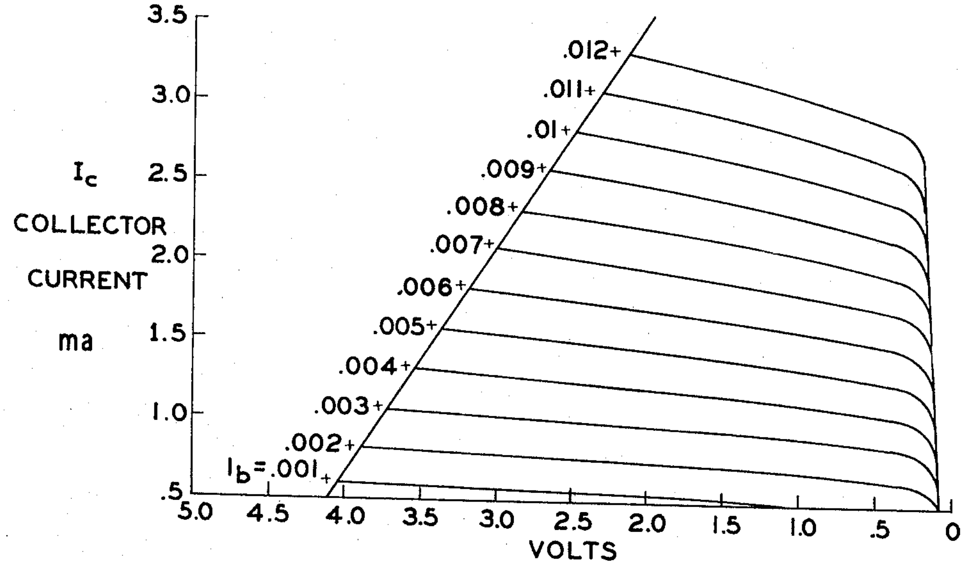
Figure 6:
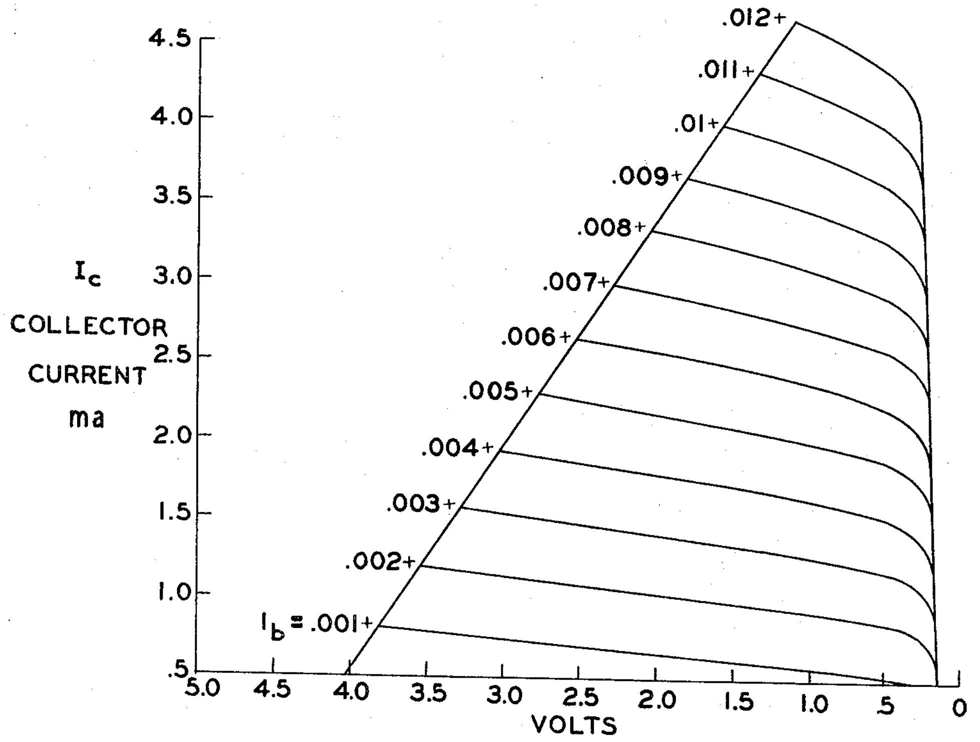

For a better understanding of the invention, as well as other objects and further features thereof, reference is had to the following detailed description of the invention to be read in conjunction with the accompanying drawings, wherein:

FIG. 1 schematically illustrates the key member of the invention as assembled in a keyboard alignment;

FIG. 2 isometrically illustrates an individual key member, partially broken away to facilitate understanding of its construction;

FIGS. 3 and 4 are different electrical circuits as could be utilized herein; and, FIGS. 5 and 6 are comparable curve tracer characteristics of a transistor of a type employed in the instant invention.

Referring now specifically to FIGS. 1 and 2, the key member of the invention in a preferred embodiment comprises a tubular shell section 10 having an annular flange 11 about its lower portion for suitable mounting as in the keyboard console shown in FIG. 1. Cemented or otherwise attached on the top end of the shell in secured pressure tight relation thereto is a deformable cap 12 having a character signal identification 13 here shown as letter "A." Mouned in an annular internal recess 14 of the shell is a pressure diaphragm 15 axially supporting a vertically dependent probe 16 therebelow. The interior volume between the diaphragm 15 and the underside of cap 12 is designated 17 and for reasons as will be understood, is preferably filled with a compressible liquid or gas. Directly below the diaphragm is a guide plate 20 having an opening 21 extending as a sleeve axially aligned about pin 16 to guide the movement thereof.

Supported below the point of probe 16 within an air space preferably evacuated and sealed to prevent the entrance of dust, moisture, oxygen, or other contaminants is a transistor 25 including its various elements of emitter 26, base 27, and collector 28 to which are externally connected their respective leads 29, 30, and 31. The transistor semi-conductor substrate end 32 is supported over a recessed opening 33 formed in a closure cap supporting structure 38 in order to effect maximum flexibility when subjected to pressure from probe 16, as will be understood.

The above therefore basically describes the structural arrangement of the components in which cap 12 is of a material subject to pressure deformation such as a thin plastic or the like, which may have a dish-like finger contour. Preferably the cap should be subject to slight deformation when encountering pressure on the order of that normally exercised by conventional typing techniques. The space 17 below the cap is filled with a compressible fluid or gas which can be air preferably pre-pressured and intended to equalize applied cap pressure regardless of the area in which the key is struck. By distributing pressure in this manner damage to the transistor structure which could otherwise accompany direct pressure on the probe is prevented. The applied cap pressure is therefore transmitted through space 17 via diaphragm 15 and probe 16 against the crystal of an uncased transistor 25. This imposes a strain on the transistor crystal in the base to emitter region such that when connected to a potential source, as shown for example, in FIGS. 3 and 4, there is effected an immediate amplified signal output through lead 40 to the appropriate logic circuitry or the like.

Also shown, diagrammatically in the circuit diagram is pressure probe 16 positioned at the approximate point of pressure in the emitter region of the transistor, imposing a strain which causes a resistance change across the junction and a change in current flow. This modulation of the current may be due to various mechanisms such as changes in the carrier mobilities, the energy gap, and the lifetime of the carriers. At large strains, recombination centers, due probably to dislocations, may be created in the semiconductor material under the probe. Accordingly, the change in resistance of the emitter junction is analogous to the application of an increased signal to the base of the common emitter transistor amplifier and the voltage output is obtained as a result of the change in the IR drop across the load resistor.

For best results, the probe tip should be hard and sharp as the semiconductor crystal is hard and small.

Larger diameter probe tips will produce the effect but with considerably less efficiency. Accordingly, finger pressure on a key is transduced through the loading point and applied to the junction region of the transistor crystal. Because of the extreme pressure sensitivity of the key, transmitted via the cap, the pressure results in a signal of adequate amplitude to trigger the appropriate circuitry.

Of the circuits shown, FIG. 3 is the simplest circuit but affording less bias stability while that of FIG. 4 affords greatest bias stability.

More specifically, in the diagram of FIG. 3, the direct supply voltages for both the collector and the base are normally the same source, and therefore, the circuit requires only one potential supply. In this circuit an essentially constant base current is set, and therefore is sensitive to gain variation. In the instant application, stability of the operating point is important if an output of specific amplitude is desired. Since there will be a wide variation in the touch (pressure loading exerted on the key) by individual operators, there would normally be a variation in the output signal amplitude from operator to operator and with position of the key on the keyboard. Also, the strength of various fingers on the operator's hand will also differ in ability to exert pressure. With this variation, those desiring square wave output pulses of exact amplitude will require the equivalent of a Schmidt trigger as the output circuit triggered off the pulse from the key. This circuit has several advantages including the requirement of a minimum number of components, the input resistance is not measurably reduced by the bias scheme, and only one power supply is required for operation.

By the addition of a resistor between the base terminal and ground there results a single-battery bias circuit as shown in FIG. 4. With $R_1$ normally 3 to 10 times larger than $R_2$, the resulting stability factor is approximately three times as stable with respect to the $I_{co}$ as the fixed biasing of FIG. 3. This embodiment therefore affords a significant improvement at the cost of one additional resistive element. Also, by grounding the base of the common-emitter configuration or returning the base to ground through a resistor of moderate size with the emitter connected to a separate potential supply, a most stable operating point can be achieved. This latter variation affords greater bias stability than that of FIG. 3 but operates with two power supplies. Variations of the above will occur to those skilled in the art.

The transistor element 25 for use herein preferably is utilized to maximum advantage in the manner whereby the greatest gain can be achieved. In accordance with the illustrated embodiment, the transistor is a PNP type but will operate equally well if of the NPN type. Transistors suitable for use herein are made in many configurations and one found most suitable is that having a crystal mounted suspended as manufactured for example, by RCA Model 2N404. The named transistor at 25° C. has a maximum rating for the collector base voltage of 25 volts, a collector emitter voltage of 24 volts and an emitter base voltage of 12 volts. Diameter is about 3/16 of an inch. This particular model transistor with the suspended crystal offers certain advantages. Since the crystal can be supported at the ends, the stress which can be exerted with a given diameter point on the probe is greater with this structure. At the same time, it is relatively inexpensive, being of a type commonly marketed for use in computer circuits or the like, and has been proved to have high inherent reliability.

Curve tracer characteristics under the same operational conditions for the Model 2N404 transistors are illustrated in FIGS. 5 and 6 wherein the abscissa represents the transistor voltage and the ordinate the collector current when operated in a common emitter circuit. FIG. 5 represents the characteristics of the normal transistor with the case removed and FIG. 6 illustrates the uncased transistor with a finger pressure touch loading. The curves show a twelve step family of the transistor when operated at specified points and the same transistor operated with finger pressure loadings. By way of example, it can be seen from the graph of FIG. 5 that for a changing base current, $I_b$ (ma.) of 0.001 and 0.011, $I_c$ (ma.) is 0.55 and 3.05 respectively giving a computed current gain of approximately 250. From FIG. 6 it can be seen that the same $I_b$ under finger loading gives a corresponding $I_c$ of 0.8 and 4.4 for an approximate computed current gain of 400. This therefore results in a 60 percent increase in output voltage available for signal emission.

By the above description, there has been disclosed a novel form of pressure transducing key member that is inexpensive to fabricate and highly sensitive for signal emission. It overcomes the prior handicaps of motions and linkages associated with mechanical devices of the prior art as to have high inherent reliability and significantly more sensitive response to a decision to effect signal input to data processing equipment. The unit is neatly packaged in a small cylindrical sealed chamber having total dimensions of approximately 5/8 inch diameter x 1 inch long. The touch of an operator is instantly transmitted as a pressure input to provide an amplified signal output. It has high reliability and with the transistor gain charge emits a signal able to operate the appropriate circuitry. By this means, a keyboard can be operated in the manner of a typewriter at extremely high rates of speed limited only by the inherent physical limitations of the operator assigned to the task.

Whereas an absence of mechanical linkage is preferred and is unnecessary to the operation hereof, mechanical systems such as a spring bias of the entire device can be incoporated to effect the sensation of mechanical movement. Human engineering may require keeping the same touch or feel that is present in conventional keyboards. By permitting movement of part or all of the key body, an operator could then receive the same touch sensation presently experienced by a typist. Mechanical movement is an unnecessary element for the function of the key and therefore does not constitute a reliability hazard if it should fail.

Since many changes could be made in the above construction, and many apparently widely different embodiments of this invention could be made without departing from the scope thereof, it is intended that matter contained in the drawings and specifications shall be interpreted as illustrative and not in a limiting sense.

What is claimed is:

1. A data input key comprising (a) an elongated hollow body member;

(b) a pressure deformable cap secured to the top portion of said body member;

(c) an uncased transistor unit having a base, an emitter and a semiconductor crystal mounted within said body and connected to a source of potential; and, (d) a pressure probe supported within said body between said cap and said transistor, said pressure probe being sensitive to a pressure deformation of said cap and responsive thereto to exert a strain on the crystal of said transistor in the base to emitter region thereof and effect an electrical signal output to utilization apparatus.

2. A data input key comprising (a) an elongated hollow body member;

(b) a pressure deformable cap secured to the top portion of said body member;

(c) an uncased transistor unit having a base, an emitter and a semiconductor crystal mounted within said body and connected to a source of potential;

(d) a pressure sensitive diaphragm supported in said body in pressure tight relation to said cap; and, (e) a pressure probe supported on said diaphragm extending therefrom to a terminal position contiguous to the crystal of said transistor, said probe being adapted to be moved by said diaphragm in response to a pressure deformation of said cap to exert a strain on the crystal of said transistor in the base to emitter region thereof and effect an electrical signal output to utilization apparatus.

3. A key according to claim 2 including a compressible fluid contained between said cap and said diaphragm for transmitting an equally distributed pressure thereto from said cap to said diaphragm.

4. A key according to claim 2 including guide means arranged about said pressure probe for guiding the directional movement thereof.

5. A key according to claim 2 in which the termination end of said pressure probe contiguous to said transistor crystal is pointed.

6. A key according to claim 2 in which said transistor is a PNP type.

References Cited by the Examiner

UNITED STATES PATENTS

| | | | |
|---|---|---|---|
| 2,632,062 | 3/1953 | Montgomery | 179—121 |
| 2,905,771 | 9/1959 | Burns | 179—110 |
| 3,161,810 | 12/1964 | Broussard | 317—234 |
| 3,161,844 | 12/1964 | Kabell | 338—2 |

OTHER REFERENCES

Bell Laboratories Record, December 1962, pp. 418–419.

JOHN F. COUCH, *Primary Examiner.*

W. E. RAY, *Assistant Examiner.*